United States Patent Office 2,931,838
Patented Apr. 5, 1960

2,931,838

2-METHYL-2-HYDROXY-4-(2,2,2-TRICHLORO-1-HYDROXYETHOXY)-PENTANE AND ITS PRODUCTION

Jørgen Erik Tind Christensen, Hellerup, near Copenhagen, Denmark, assignor to Det Danske Medicinal- & Kemikalie-Kompagni A-S, Copenhagen, Denmark No Drawing. Application November 26, 1957
Serial No. 699,143

Claims priority, application Denmark December 8, 1956

5 Claims. (Cl. 260—615)

The present invention relates to a new chloral derivative and the production thereof.

Although chloral hydrate is the oldest of the synthetic hypnotics it is still in use as a very reliable hypnotic with a sure and pleasant effect without unpleasant after-effects.

After the introduction of the barbituric acid derivatives, the use of chloral hydrate decrease somewhat owing to the disadvantages connected with its actual use as a hypnotic. Thus it has a penetrating and unpleasant smell and taste, but is at the same time too hygroscopic to be conveniently dispensed in capsules or tablets. Moreover, an administration in capsules or tablets would hardly be advisable on account of the local irritating effect which the substance exerts on the mucous membrane of the stomach.

In the course of time, numerous attempts have been made to produce chloral derivatives not having the said disadvantages, but retaining the beneficient properties of the chloral as a hypnotic. However, none of the hitherto produced derivatives have been so satisfying as to bring them into general use, and it is still most common to administer chloral hydrate in aqueous solution, the solution being extremely diluted in order to mitigate the local irritating effect.

According to the present invention there is provided a new chloral derivative which is 2-methyl-2-hydroxy-4-(2,2,2-trichloro-1-hydroxyethoxy)-pentane of the formula

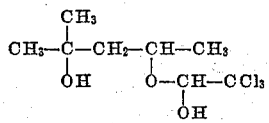

According to the invention, this chloral derivative can be prepared by reacting chloral, chloral hydrate or a chloral alcoholate with 2-methyl-2,4-pentanediol with or without a solvent being present.

The chloral derivative forms colourless and odourless or substantially odourless crystals of a slightly bitter taste. The melting point is 102 to 104° C., and the compound is easily soluble in alcohol and chloroform, moderately soluble in ether and slightly soluble in tetrachloromethane.

The new chloral derivative is sparingly soluble in water, but is hydrolized in aqueous solution according to the equilibrium reaction:

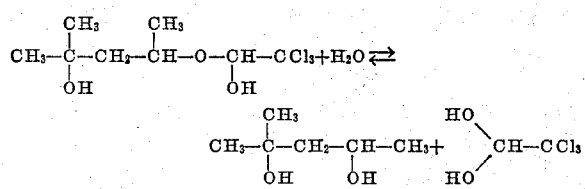

For total dissolution, i.e. hydrolysis, of the chloral derivative at room temperature at least about 3.5 parts of water are needed. Of course, the rate of the hydrolysis is dependant on various factors, such as stirring, temperature and particle size.

The new chloral derivative has no irritating effect. A freshly made suspension in water leaves no necrosis on being injected subcutaneously. The derivative is, however, particularly useful as a hypnotic for administration in tablets since the said hydrolysis, taking place in the gastro-intestinal tract, proceeds at a suitably slow rate, so that there are never at any time larger amounts of chloral hydrate causing irritation of the mucous membrane of the stomach, the hydrolysis on the other hand being so rapid that the hynotic effect is not notably delayed. Clinical experiments, comprising a larger number of patients, have perfectly confirmed this.

Prior to the clinical experiments, a number of animal tests were carried out, in which the effects of the new derivative were compared with those of chloral hydrate.

In one such experiment, a group of mice was given doses of 500 mg. chloral hydrate per kilogram, and another group was given corresponding doses of the new derivative. The average anaesthesia time (50% of the animals awake) proved to be 150 minutes for the animals which were given chloral hydrate, and 200 minutes for those given the new derivative.

In another experiment, the amounts of organic bound chlorine excreted in the urine were determined in a group of 4 rabbits. First, 2 g. of chloral hydrate were administered to each rabbit by means of a stomach tube. After 48 hours almost no chlorine was found in the urine. The average recovery was 69%. Then, each of the animals was given 3.2 g. of the new derivative (corresponding to 2 g. of chloral hydrate). Here, the average recovery of organic bound chlorine was 60%.

In a corresponding experiment with 4 healthy human subjects, two of which were given doses of 1 g. and the other two of 2 g. calculated as chloral hydrate, the average recovery was 25% after administration of chloral hydrate, and 22% after administration of the new derivative.

A toxicity determination on mice showed, as would be expected, that the toxicity was near to but, however, a little below the toxicity of the amount of free chloral hydrate which corresponds to the chloral content of the derivative. Thus, the LD 50 for the free chloral hydrate was determined to 21 mg. per 25 g. mice, whereas LD 50 for chloral in the shape of the present chloral derivative was determined to 23 mg., corresponding to 37 mg. derivative, per 25 g. mice.

In the clinical trial of the new derivative, the attention was particularly directed to the observation of secondary effects.

The derivative was used as a hypnotic in series of patients suffering from severe sleeplessness, mainly chronic neurotics of a complaining type. The usual hypnotic (a barbiturate) was substituted by 2 tablets, each containing 0.40 g. of the new derivative, corresponding to 0.25 g. of chloral hydrate. None of the patients reacted to the change, and there were no gastric upsets.

Five patients were given the new derivative as a sedative during the day, one tablet as above being given in the morning, one at noon, and two in the evening. This dose was given daily for about 6 months. The normal clinical analyses were carried out. No albuminuria was observed.

Five patients being given 2 tablets daily for more than 3 months showed normal haemoglobin and red cells. The white blood cells were found to be between 5000 and 8000 per cubic millimeter blood.

The 2-methyl-2,4-pentanediol which is used in preparing the present compound is a substance which is widely used as a solvent, and according to the available information it must be considered substantially non-toxic and exempt of any local irritating effect by administration in the proportions in question here.

The method of the invention is illustrated by the following examples:

Example 1

590 g. of 2-methyl-2,4-pentanediol (5 moles) are mixed with 3 litres of tetrachloromethane, and 737 g. of chloral (5 moles) are added successively with stirring.

By commencing crystallization, the reaction mixture is stirred until cooled to room temperature, whereafter the mixture is placed in a refrigerator. The next day, the crystals are filtered off, washed with cooled tetrachloromethane and dried by slight heating. The yield is 1260 g. (about 95%).

Example 2

472 g. of 2-methyl-2,4-pentanediol (4 moles) are heated to 70 to 80° C. in a bowl, and 660 g. of chloral hydrate (4 moles) are added. The temperature, which decreases during the addition, is then increased to 60 to 70° C. under continuous stirring until all of the chloral hydrate is dissolved, and the stirring is continued at a somewhat lower temperature. When the reaction mixture has become a nearly dry crystal powder, this powder is subjected to further drying by slight heating. The weight of the final raw product will be about 1060 g., corresponding to the weight of the two components less 4 moles $H_2O$ which are formed by the reaction. Recrystallization is carried out from tetrachloromethane, and the yield is 980 g. (about 92%).

Instead of chloral hydrate, for example, chloral ethanolate may be used in an amount of 774 g. (4 moles). The method is carried out in the same manner, the only difference being that in this case 4 moles of ethanol is formed instead of 4 moles of water.

I claim:

1. As a compound, 2-methyl-2-hydroxy-4-(2,2,2-trichloro-1-hydroxyethoxy)-pentane.

2. A method for the production of 2-methyl-2-hydroxy-4-(2,2,2-trichloro-1-hydroxyethoxy)-pentane, in which chloral is added to a solution of 2-methyl-2,4-pentanediol in tetrachloromethane at room temperature.

3. A method for the production of 2-methyl-2-hydroxy-4-(2,2,2-trichloro-1-hydroxyethoxy)-pentane comprising mixing equi-molecular proportions of chloral with 2-methyl-2,4-pentanediol in tetrachloromethane, stirring the mixture at room temperature to promote crystallization, and filtering off the resulting crystals.

4. A method for the production of 2-methyl-2-hydroxy-4-(2,2,2-trichloro-1-hydroxyethoxy)-pentane comprising heating 2-methyl-2,4-pentanediol to a temperature of 70 to 80° C., adding chloral hydrate in equimolecular proportions to react with the 2-methyl-2,4-pentanediol, continuously stirring the mixture of chloral hydrate and 2-methyl-2,4-pentanediol while maintaining the temperature at 60 to 70° C. until all of the chloral hydrate is dissolved, and continuing stirring of the reaction mixture until the latter becomes a dry crystal powder.

5. A method for the production of 2-methyl-2-hydroxy-4-(2,2,2-trichloro-1-hydroxyethoxy)-pentane, comprising heating 2-methyl-2,4-pentanediol to a temperature of 70 to 80° C., adding chloral ethanolate in equimolecular proportions to react with the 2-methyl-2,4-pentanediol, stirring the reactants while maintaining the temperature at 60 to 70° C. until all of the chloral ethanolate is dissolved, and continuing to stir the reactants until a dry crystal powder is formed therefrom.

References Cited in the file of this patent

UNITED STATES PATENTS

| | | |
|---|---|---|
| 2,666,082 | Scudi et al. | Jan. 12, 1954 |
| 2,784,180 | Tislow et al. | Mar. 5, 1957 |
| 2,784,237 | Bruce | Mar. 5, 1957 |

OTHER REFERENCES

Gatski: American Practitioner and Digest of Treatment, vol. 6, No. 12 (1955), pp. 1885–1891.